(12) United States Patent
O'Connor et al.

(10) Patent No.: US 6,446,397 B1
(45) Date of Patent: Sep. 10, 2002

(54) TELESCOPING COVER BUMPER

(75) Inventors: Thomas R. O'Connor, Greenfield; Chad M. Kernats, Colgate, both of WI (US)

(73) Assignee: A & A Mfg. Co. Inc., New Berlin, WI (US)

( * ) Notice: Subject to any disclaimer, the term of this patent is extended or adjusted under 35 U.S.C. 154(b) by 0 days.

(21) Appl. No.: 09/834,531

(22) Filed: Apr. 13, 2001

(51) Int. Cl.⁷ .............................................. E05D 15/06
(52) U.S. Cl. ................. 52/64; 52/67; 160/202; 160/223; 74/608; 409/134
(58) Field of Search ................. 52/64, 67, 74; 160/197, 202, 214, 222, 223; 220/8; 74/608; 464/172; 409/134

(56) References Cited

U.S. PATENT DOCUMENTS

| | | | | |
|---|---|---|---|---|
| 3,603,651 A | * | 9/1971 | Weber | 384/16 |
| 4,039,021 A | * | 8/1977 | Moritz et al. | 160/202 |
| 4,522,246 A | * | 6/1985 | Bierbrauer et al. | 160/223 |
| 4,771,906 A | * | 9/1988 | Hennig et al. | 220/8 |
| 5,156,195 A | * | 10/1992 | Wehler et al. | 160/202 |
| 5,169,223 A | * | 12/1992 | Suzuki et al. | 312/330.1 |
| 5,199,926 A | * | 4/1993 | Hennig et al. | 464/170 |

FOREIGN PATENT DOCUMENTS

| | | | |
|---|---|---|---|
| DE | 4214118 A | * | 11/1993 |
| EP | 1909714 A | * | 4/2001 |
| JP | P2000-107979 A | * | 4/2000 |

OTHER PUBLICATIONS

Applicant's Exhibit A—Figs. 1–8 illustrating two different admitted prior art telescoping cover bumpers.

* cited by examiner

*Primary Examiner*—Carl D. Friedman
*Assistant Examiner*—Brian E. Glessner
(74) *Attorney, Agent, or Firm*—Quarles & Brady LLP

(57) ABSTRACT

A dog-bone shaped bumper for a telescoping way cover extends on both sides of the rear flange of the cover and defines spaces which close upon flexing of forked ends of the bumper between the rear flange and the next adjacent cover section to reduce the impact between sections when expanding and retracting the cover.

5 Claims, 4 Drawing Sheets

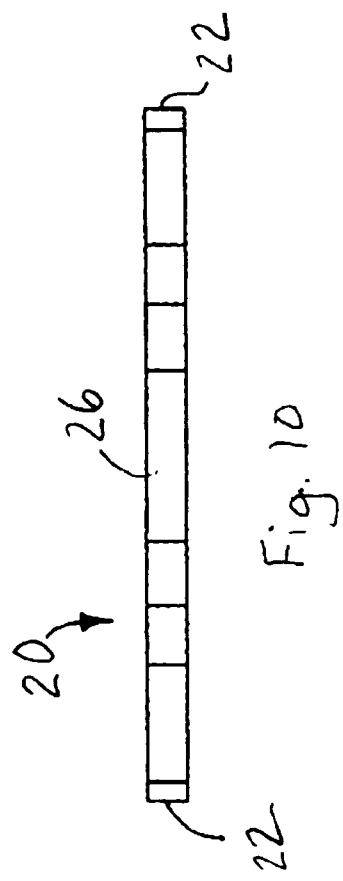
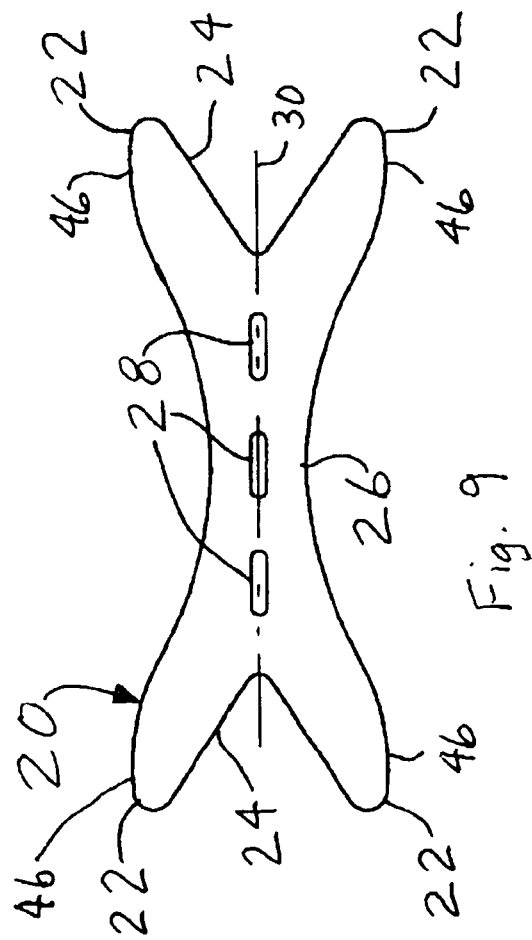
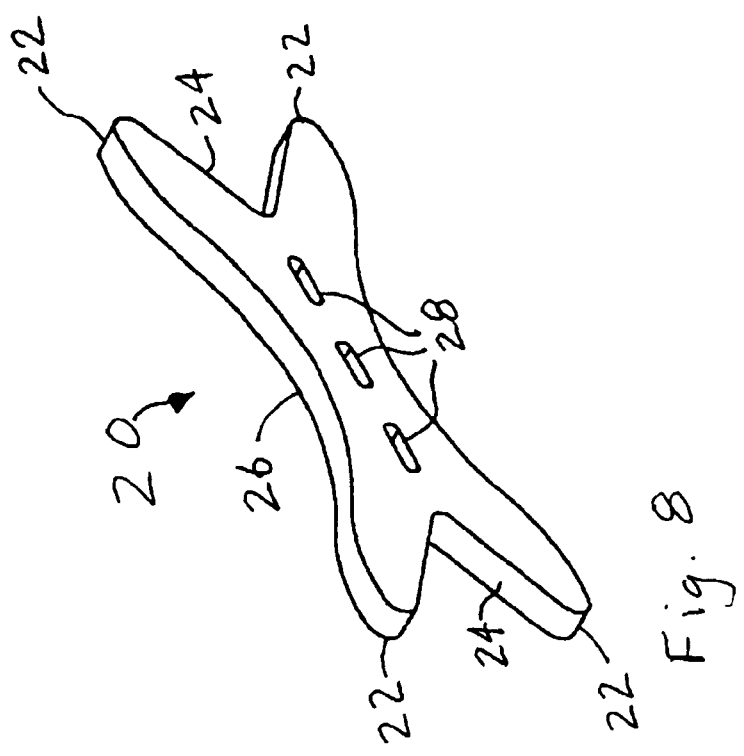

TELESCOPING COVER BUMPER

CROSS-REFERENCE TO RELATED APPLICATION

Not applicable.

STATEMENT CONCERNING FEDERALLY SPONSORED RESEARCH OR DEVELOPMENT

Not applicable.

FIELD OF THE INVENTION

This invention relates to telescoping covers and in particular to a bumper of a telescoping cover which absorbs the impact between adjacent cover sections upon extension and retraction of the cover.

BACKGROUND OF THE INVENTION

Telescoping covers, such as the telescoping machine tool way covers shown in FIGS. 1–3, are typically made of a number of sheet metal sections which are telescoped together. The sections have end walls or flanges that catch on one another so that when one end of the cover is pulled away from the opposite end of the cover, the cover expands by one of the end walls or flanges of one of the sections abutting the end wall or flange of the next adjacent section. Similarly, when retracting, the end walls or flanges of the way sections abut the end walls or flanges of the adjacent way sections until the way cover is totally collapsed.

Some sort of bumpers have normally been used to dampen the impact as one way cover section bumps into another. These bumpers have typically been elastomeric pads which are placed between the abutting walls of adjacent way cover sections.

While they have been somewhat effective, the spring rate of them has generally been either too soft or too stiff. Also, as they have typically been molded elastomeric compound, they have been prone to deterioration from repetitive use and attack by the oils and chemicals. Others have been simply adhered to the walls of the sections and have been prone to falling off which can jam the way cover since if it falls off on one side but not the other, it can become skewed, requiring expensive downtime of the machine tool.

SUMMARY OF THE INVENTION

The present invention provides a bumper with a spring rate and dampening capability adapted for a way cover which is dog-bone shaped and made of an elastomeric material which is held on a flange of a way cover section so that it straddles the flange, extending from each side of the flange. The bumper is dog-bone shaped to provide a combination of flexing and compression to yield a soft start from flexing of the ends of the bumper and provide faster acceleration of the cover sections beyond the flexing limit of the bumper.

Two or more such bumpers, each of a uniform thickness, are preferably provided on each flange.

In addition, since the bumper is made of an elastomeric material, it can be made with mounting holes which can be expanded over mounting projections of the flange so as to hold the bumper mechanically straddling the flange. Such a bumper provides a progressive spring rate to dampen the acceleration forces that occur when one section bumps into another and which is durable, easily assembled and largely trouble-free in use.

The foregoing and other objects and advantages of the invention will appear in the detailed description which follows. In the description, reference is made to the accompanying drawings which illustrate a preferred embodiment of the invention.

BRIEF DESCRIPTION OF THE DRAWINGS

FIG. 8 is a perspective view of a cover bumper of the invention;

FIG. 9 is a top plan view of the bumper of FIG. 8; and

FIG. 10 is a side plan view of the bumper of FIGS. 8 and 9.

DETAILED DESCRIPTION OF THE PREFERRED EMBODIMENTS

Figure 1:
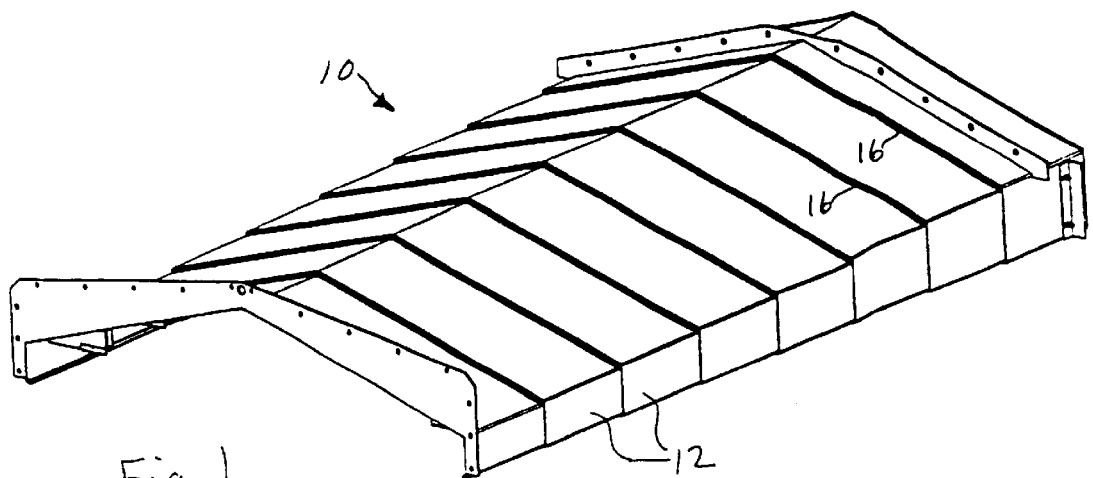
FIG. 1 is a perspective view of a telescoping way cover of the type in which bumpers of the invention are used.
Figure 2:
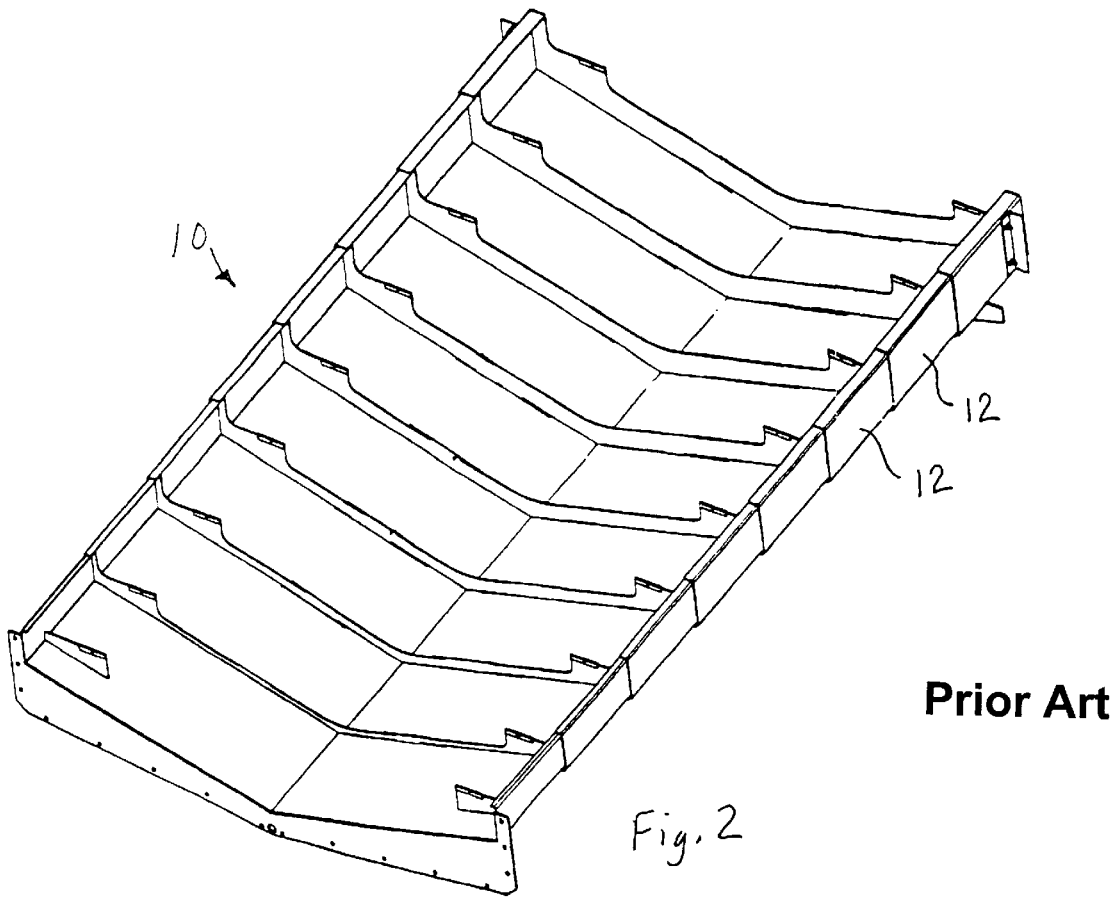
FIG. 2 is a bottom perspective view of the cover of FIG. 1.
Figure 3:
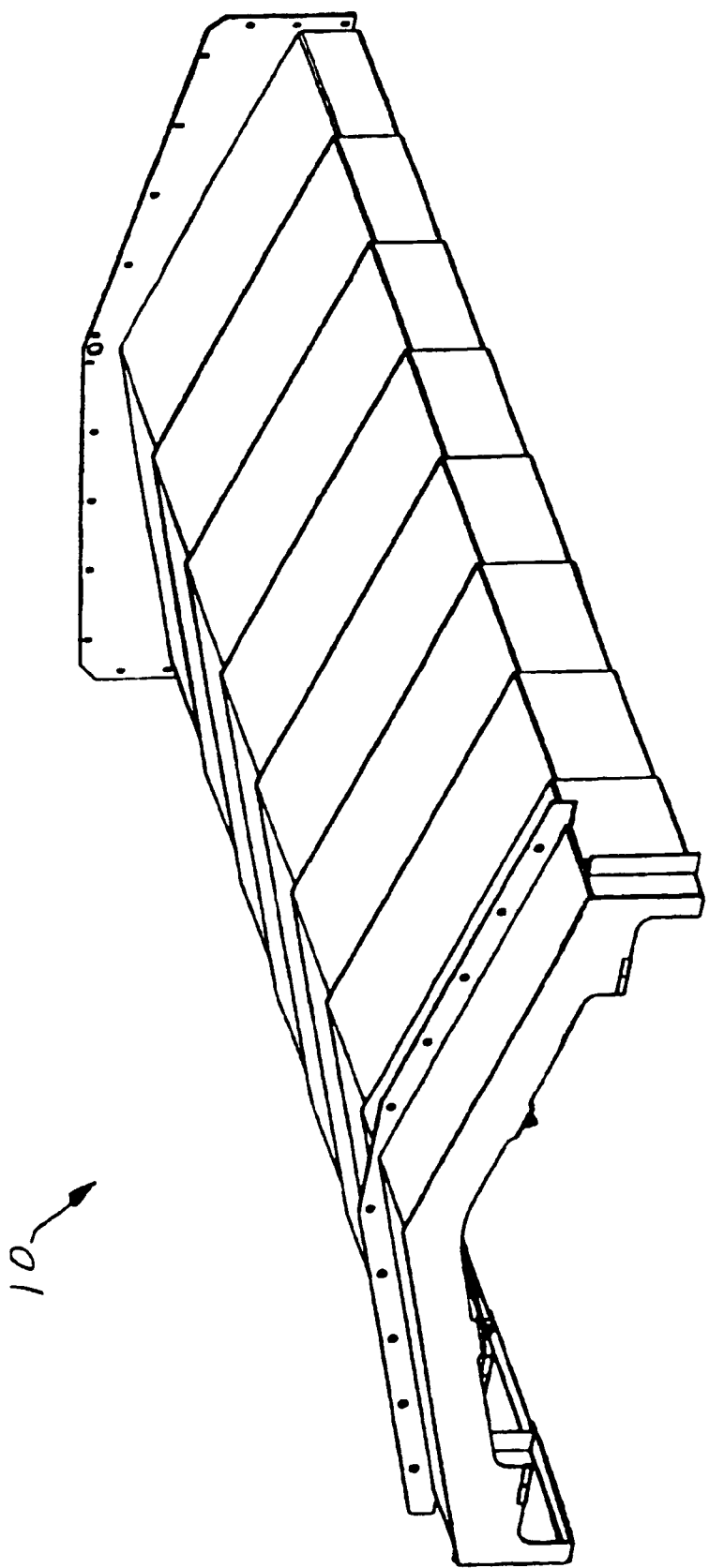
FIG. 3 is a perspective view of the cover of FIG. 1 from the opposite end.

FIGS. 1–3 illustrate a known construction of a telescoping way cover 10 of the type which could incorporate bumpers and bumper retaining structures of the invention. Such a way cover is made up of a number of sections 12 which are telescoped relative to one another.

Typically, one end of the cover 10 is fixed to the stationary frame of a machine tool and the other end is affixed to the moving table of the machine tool so that the cover 10 can telescope extended over the ways of the machine tool to cover them, or telescope retracted. Wipers 16 may be provided at the outer exposed edge of each of the sections 12 to wipe over the top of the adjacent section when the cover is closed to keep it clean of any debris which may have fallen down from the machining head.

Figure 5:
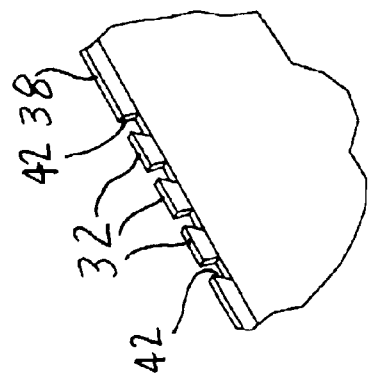
FIG. 5 is a detail view of area B of FIG. 4.
Figure 4:
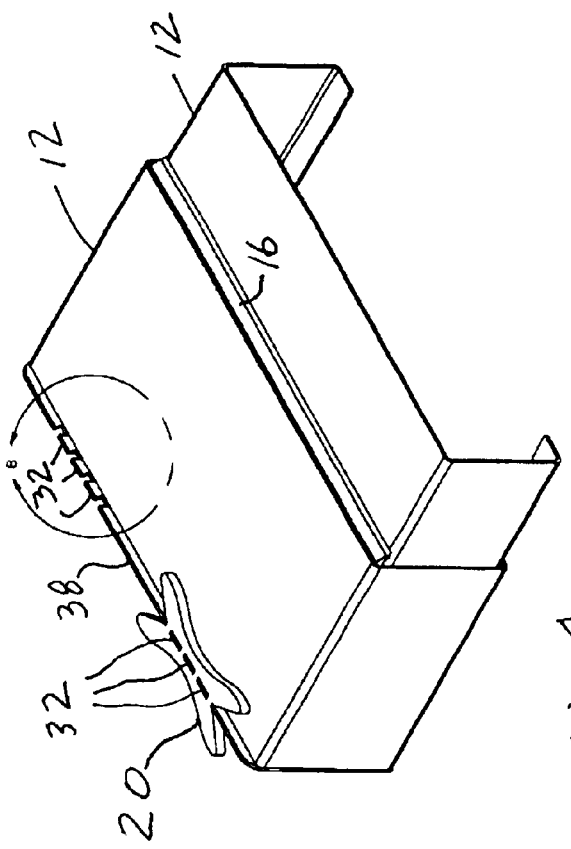
FIG 4 is a perspective view of two telescoping middle sections of a cover like that shown in FIGS. 1–3, with one of the bumpers of the invention shown on the left set of mounting projections.
Figure 6:
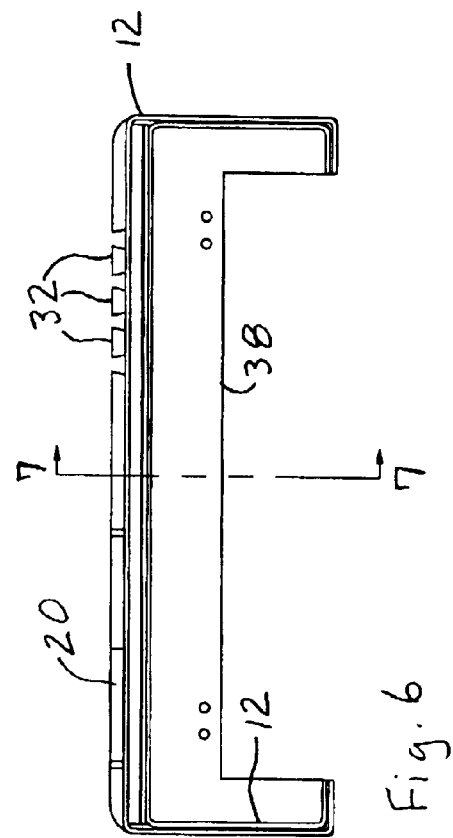
FIG. 6 is an end view of the cover sections of FIG. 4.
Figure 7:
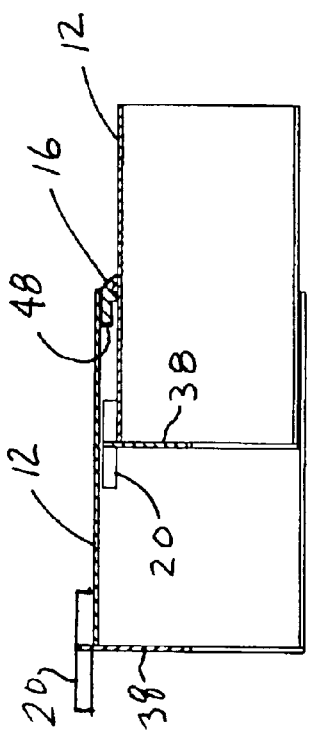
FIG. 7 is a sectional view from the plane of the line 7—7 of FIG. 6.

FIGS. 4–6 illustrate two telescoping sections for a telescoping way cover like that of FIGS. 1–3, although the way cover sections in FIGS. 4–6 are flat top whereas the way cover of FIGS. 1–3 is peaked. The operation of the way cover of FIGS. 4–6 is, however, generally the same. In addition, the way cover sections of FIGS. 4–6 are modified to incorporate bumpers of the invention. Referring to FIG. 4, a bumper 20 of the invention is flat with a generally dog bone-shaped profile, being forked at each end and of reduced width in the middle. Referring to FIGS. 8–10, the bumper 20 is preferably cut from elastomeric sheet material. A suitable material is high-grade buna elastomeric sheet material (e.g., Shore A 45–55 hardness, ¼" thick for larger, heavier covers and ³⁄₁₆" thick for smaller covers). Sheet material is more dense and homogeneous than molded material, and is more resistant to fatigue and chemicals and oils in the machining environment.

The bumper 20 has forked ends 22 with a V-shaped depression 24 between the ends. The ends 22 at each end of the bumper 20 are spaced apart, and the central section 26 of the bumper 20 is reduced in width from the end sections.

Three elongated holes 28 are aligned along an axis 30 (FIG. 9) of the bumper 20 and are sized so that when they are slightly stretched out, they fit over three tabs 32 which are generally trapezoidally-shaped, tapering toward the bottom, and are cut into the upper edge of flange 38 of each section 12.

The shape of the bumper 20, and particularly the V-shaped notches 24, enables it to fit closely between the ends 42 which are cut in the flange 38, with the two ends 22 which are on one side of axis 30 extending on one side of the flange 38, and the other two ends 22 on the other side of the axis 30 extending on the other side of the flange 38. The V-shaped notch 24 also gives room for the two ends 22 on each side of the flange 38 to flex toward the flange, as does the narrowed down width of the bumper 20 in the central section 26, so that the ends flex to initiate a "soft start" to the motion of a stationary section being pushed or pulled by an adjacent moving cover section. Rapid acceleration or higher forces between the two sections result in compression of the elastomeric material of the bumper 20 when the limit of flexing of the ends 22 is reached. The thickness of the bumper 20 should be sufficient to resist torsional forces which tend to roll the ends out of their normal, unstressed plane.

On the front side of the flange 38, the sides 46 adjacent to the ends 22 contact the rear side of the wiper retainer 48 when the two sections 12 are expanded relative to one another and the ends 22 are compressed against the front side of the flange 38 thereby. When the sections 12 are retracted relative to one another, the two ends 22 on the rear side of the flange 38 contact the flange 38 below the top wall of the next larger section 12 and are compressed against the flange 38 of the section on which the bumper is mounted. It is noted that in FIGS. 4 and 6, only one bumper 20 is shown assembled to the section 12, although bumpers 20 would be provided on both sides of the section 12 attached to both sets of tabs 32 which are provided in the section 12. The flanges 38 and the wiper retainer 48 are welded to the sections 12, which are made of sheet steel.

Preferred embodiments of the invention have been described in considerable detail. Many modifications and variations to the embodiments described will be apparent to those skilled in the art. Therefore, the invention should not be limited to the embodiments described but should be defined by the claims which follow.

We claim:

1. In a bumper for a telescoping way cover of the type which has sections telescopically arranged with one another, each section having a rear flange extending above a top wall of the section, with the bumper affixed to the rear flange so as to abut walls of next adjacent cover sections when the cover is expanded and retracted, the improvement wherein said cover bumper is dog-bone shaped, said bumper having forked ends and a central section of reduced width so as to create spaces between said forked ends and in said central section so that said ends flex toward said flange to reduce the impact between adjacent sections as said cover is expanded and retracted.

2. The improvement of claim 1, wherein said bumper extends on both sides of said rear flange.

3. The improvement of claim 1, wherein said bumper has at least one central slot in which a tab of said flange is received to mount said bumper on said flange.

4. The improvement of claim 1, wherein said bumper is uniform in thickness.

5. The improvement of claim 1, wherein said space between said forked ends is V-shaped.

* * * * *